June 21, 1927.

J. J. FLANIGAN

SPINDLE

Original Filed Nov. 30, 1925

1,633,084

Inventor
John J. Flanigan
By Wm. O. Belt Atty.

Patented June 21, 1927.

1,633,084

UNITED STATES PATENT OFFICE.

JOHN J. FLANIGAN, OF OAK PARK, ILLINOIS.

SPINDLE.

Original application filed April 6, 1925, Serial No. 20,890. Divided and application filed November 30, 1925, Serial No. 72,088. Divided and this application filed May 17, 1926. Serial No. 109,622.

This application is a division of my co-pending application Serial No. 72,088, filed November 30, 1925, which is a division of my co-pending application Serial No. 20,890, filed April 6, 1925.

The invention relates to gelatin band spindles for hectograph machines and its object is to provide a novel and improved spindle adapted to be securely mounted upon a conveyor to hold the band at desired tension while it is being used.

A further object of the invention is to mount the spindle upon the conveyor chains so that they cannot be readily detached and so that they will be constantly maintained in proper position free from relative movement between the parts of the spindle.

In the accompanying drawings illustrating a selected embodiment of the invention, Fig. 1 is a plan view of a spindle embodying the invention, the band being omitted and the spindle being shown mounted on parts of the conveyor chains.

Figure 1:
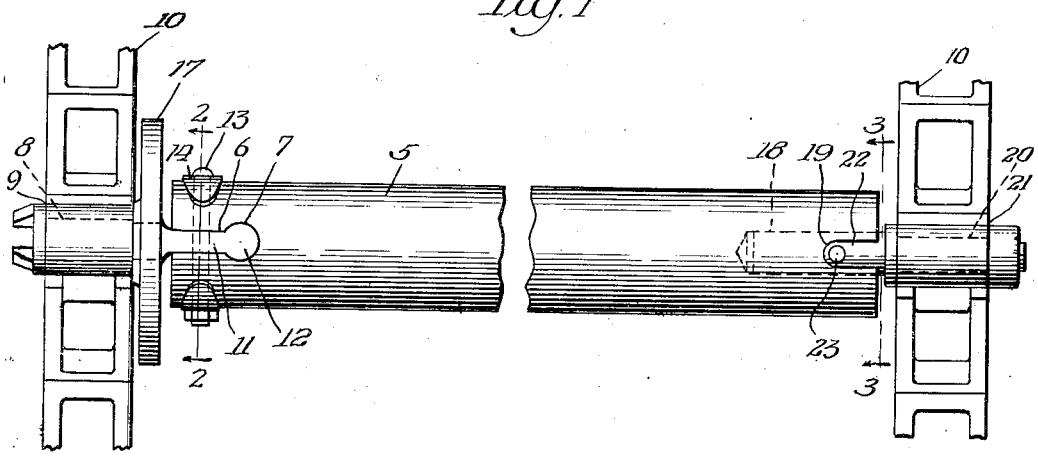
Figure 2:
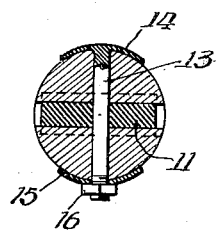
Fig. 2 is a sectional view on the line 2—2 of Fig. 1.

Referring to the drawings the spindle 5 may be made of any solid material, such as wood, and it is provided at one end with a longitudinal slot 6 which terminates in an enlarged circular recess 7. The journal 8 for this end of the spindle has a bearing 9 in one of the conveyor chains 10 and it is provided with an end projection 11 rectangular in shape and terminating in an enlarged circular head 12. The slot 6 and the recess 7 extend entirely through the spindle 5, the slot being substantially rectangular in shape and the recess being substantially circular in shape. The projection 11 is substantially rectangular in shape and the head 12 is substantially circular in shape to fit snugly in the slot and recess 6, 7. A bolt 13 passes transversely through the spindle and the projection 11 to secure the spindle rigidly to the journal, and this bolt has an enlarged head 14 which is flattened and fitted snugly against the periphery of the spindle, a washer 15 which is flattened and fitted snugly against the periphery of the spindle, and a nut 16, as shown in Fig. 2. The journal is also provided with a disk 17 to be engaged by a brake, but this may be omitted if desired.

Figure 3:
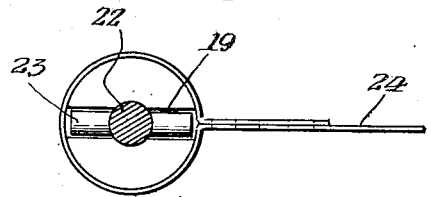
Fig. 3 is a sectional view on the line 3—3 of Fig. 1 and showing part of the band secured on the spindle.
Figure 4:
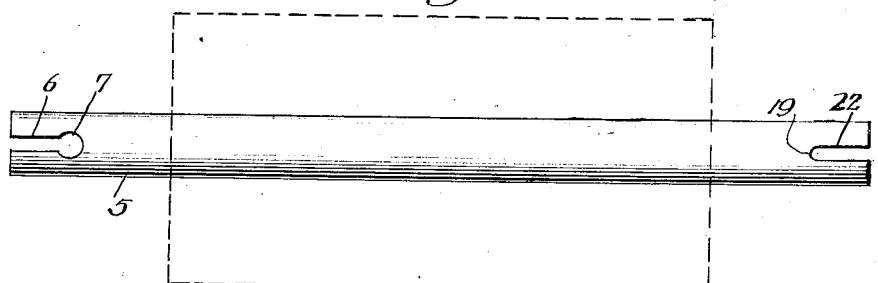
Fig. 4 is a plan view showing the spindle carrying a portion of a gelatin band roll and detached from its journals.

The other end of the spindle is provided with a longitudinal bore 18 and a transverse slot 19 extending through its end. The journal 20 is mounted in a bearing 21 in a conveyor chain 10 and it has a projection 22 which extends into the bore 18. A pin 23 extends transversely through the projection 22 and is positioned in the slot 19, as shown in Fig. 3. The band 24 may be secured on the spindle by any suitable means.

My invention provides a spindle of novel construction adapted for engagement with journals specially constructed so that the owner of the machine may always be assured of getting replacement spindles and rolls which will function properly with the conveyor and the other parts of the machine. It is highly important to provide a spindle which can be mounted properly and held securely upon the conveyor so that the gelatin band may be drawn from the roll as required for use and rewound upon the spindle without kinking or stretching or in any manner destroying its predetermined uniform thickness. If the gelatin band is stretched unduly or unevenly it will reduce in thickness, thereby causing a variation in thickness at printing position. This will produce an uneven pressure during the printing operation and result in unsatisfactory work. Other disadvantages will result from improper or insecure mounting of a spindle as well as from the use of a roll which is not standard as to size and otherwise for the machine and which may be of inferior quality. Therefore it is important that the spindle should be mounted securely and in a relatively rigid manner upon the conveyor chains so that it will be constantly held in proper position while the roll is in use. The spindle is engaged with the journal projections by first engaging the bore 18 with the projection 22 and the transverse slot 19 with the pin 23 by an endwise movement of the spindle; and then the slot and recess 6, 7 at the other end of the spindle are engaged with the projection and head 11, 12 by a sidewise movement. The bolt 13 is then inserted and secured by the nut 16. Thus the spindle is rigidly and securely mounted upon the journals against relative movement in any direction. The projection 11 and the head 12 fit snugly in the slot 6 and the recess 7 and the bolt 13 passing through the spindle and the projection 11 rigidly and securely holds these parts together. The projection 23 fits snugly in the bore 18 and the transverse pin 23 registers the spindle with the headed projection 11, 12 and holds the spindle in proper position for engagement with said headed projection. Thus the spindle is always maintained in proper position on the conveyor and in exact longitudinal alignment with its journals so that the spindle will revolve to unwind or to wind the gelatin band evenly and uniformly as required. I have illustrated the invention in a form which I have found satisfactory for actual use, but I appreciate that changes may be made to meet various conditions and therefore I reserve the right to make all changes in the form, construction and arrangement of parts as fairly fall within the scope of the following claims.

I claim:—

1. A gelatin roll spindle for hectograph machines having a transverse slot extending through one end of the spindle and terminating at its inner end in a circular transverse recess.

2. A gelatin roll spindle for hectograph machines having a longitudinal bore at one end and a transverse slot intersecting said bore and extending through that end of the spindle, and a transverse slot in the other end of the spindle aligned with said first mentioned slot.

3. A gelatin roll spindle for hectograph machines having a transverse slot extending through one end of the spindle and terminating at its inner end in a circular transverse recess, a bore in the other end of the spindle, and a transverse slot in said other end of the spindle aligned with the first mentioned slot.

4. The combination of a pair of conveyor chains, a spindle, journals engaging the chains and carrying said spindle, one of said journals having a rectangular projection and a circular head on the outer end thereof, and said spindle having at one end a rectangular slot to receive said projection and a circular recess to receive said head, and means for securing the spindle to said projection.

5. The combination of a spindle having at one end a slot terminating in a recess and having at its other end a bore and an intersecting slot aligned with said first mentioned slot, and a pair of journals, one of said journals having a projection and a head to engage the slot and recess at one end of the spindle and having a projection and transverse pin to engage the bore and slot at the other end of the spindle, and means for securing the spindle on said projections.

6. The combination of a spindle having a slot at one end terminating in a recess, a journal having a projection and a head thereon engaging said slot and recess, and a bolt passing transversely through the spindle and said projection for securing the spindle on the journal.

7. The combination of a spindle having a slot at one end terminating in a recess, a journal having a projection and a head thereon engaging said slot and recess, and a bolt passing transversely through the spindle and said projection for securing the spindle on the journal, said bolt having a flattened head shaped to fit the periphery of the spindle and being provided with a flattened washer shaped to fit the periphery of the spindle.

8. The combination of a spindle for hectograph machines having a longitudinal bore at one end and a transverse slot intersecting said bore and extending through that end of the spindle, a transverse slot in the other end of the spindle aligned with said first mentioned slot, a roll of gelatin band on the spindle, the inner end of said band being fastened to the spindle, and a clip at the outer end of the band.

9. The combination of a spindle for hectograph machines having a transverse slot extending through one end thereof and terminating at its inner end in a circular transverse recess, a roll of gelatin band on the spindle, the inner end of said band being fastened to the spindle, and a clip at the outer end of the band.

10. The combination of a spindle for hectograph machines having a transverse slot extending through one end thereof and terminating at its inner end in a circular transverse recess, a bore in the other end of the spindle, a transverse slot in the other end of the spindle aligned with the first mentioned slot, a roll of gelatin band on the spindle, the inner end of said band being fastened to the spindle, and a clip at the outer end of the band.

JOHN J. FLANIGAN.